United States Patent [19]

Eckhaus

[11] Patent Number: 4,935,585
[45] Date of Patent: Jun. 19, 1990

[54] RETRACTING ELECTRICAL WINDOW AND DOOR CORD

[76] Inventor: Ira Eckhaus, 3221 Skillman Ave., Oceanside, N.Y. 11572

[21] Appl. No.: 195,717

[22] Filed: May 18, 1988

[51] Int. Cl.[5] .............................................. H02G 11/02
[52] U.S. Cl. .............................................. 191/12.2 R
[58] Field of Search .................... 191/12.2 R, 12.2 A, 191/12.4; 248/329, 330.1; 267/69, 148, 154; 242/77, 107

[56] References Cited

U.S. PATENT DOCUMENTS

| 474,003 | 5/1892 | Dills | 191/12.2 R |
|---|---|---|---|
| 1,464,631 | 8/1923 | Spuehler | 191/12.2 R |
| 1,846,536 | 2/1932 | Walker | 191/12.2 R |
| 1,953,581 | 4/1934 | Ballou | 191/12.2 R |
| 2,440,719 | 5/1948 | Karp et al. | 191/12.2 R |
| 2,821,453 | 1/1958 | Jessen | 191/12.4 X |
| 2,860,197 | 11/1958 | Kost | 191/12.2 R |
| 4,102,445 | 7/1978 | Eurom | 191/12.2 R |
| 4,826,099 | 5/1989 | Johnson | 242/107 |

FOREIGN PATENT DOCUMENTS

| 0620715 | 5/1961 | Italy | 242/107 |
|---|---|---|---|
| 0618942 | 8/1980 | Switzerland | 242/107 |

Primary Examiner—Andres Kashnikow
Attorney, Agent, or Firm—Helfgott & Karas

[57] ABSTRACT

Electrical cord extension and retraction is achieved with a reel having a spool core around which the cord is wound. The spool core has two metal ends, to each of which is connected a wire of the electrical cord. Each metal end makes circular sliding electrical contact with a track mounted on the inside of a side housing member. Winding torque is supplied by an elastic member with parallel separated filaments that is fastened between the side members and held by opposing diametrical fingers positioned on the inside of the spool core.

3 Claims, 3 Drawing Sheets

RETRACTING ELECTRICAL WINDOW AND DOOR CORD

This invention is in the field of retracting electrical cord apparatus for such applications as movable windows or sliding doors.

BACKGROUND OF THE INVENTION

There are many applications where electrical continuity is desired between wiring attached to a frame and wiring provided on a movable member. Such a situation is encountered in the security field such as a burglar alarm system. Frequently the movable window or the sliding door is provided with a thin electrical conducting foil on the glass. The foil must be interconnected to the wiring on the frame and yet permit the window to move up or crank out or the door to slide open. In such construction there is often utilized an electrical cord between a foil block and the door frame. With such construction there has been a problem in that the electrical cord tends to droop when the door or window is closed and may, therefore, get tangled or caught and cause intermittent or breaks in the wire. In some instances malfunctions occur due to the breaking of these electrical connections.

A standard technique heretofore in the art has been to provide spring tension on the electrical cord that tends to pull the cord back out of the way when the window or door is in the closed position and in the open position keeps the cord under mild tension. However, here also the coil sags in the closed door position and gets caught, thereby causing accidents and malfunctions. Also, the drooping wires are aesthetically a poor looking sight.

SUMMARY OF INVENTION

The present invention provides controlled electrical cord extension and retraction using an electrical continuity maintaining reel that pays out the cord as the movable portion of the window or door opens, and then rewinds the cord back on the reel as the window or door returns to the closed position. The invention includes a strain relieving cord retainer for the wire on the movable portion of the window or door which prevents any strain of the retracting mechanism from being transmitted to any relatively delicate electrical conditions on the moveable member. The electrical cord extension and retraction is achieved by means of a reel having a spool core around which the cord is wound. The spool core includes two metal ends, to each of which a respective end of a two-wire pair of wires is attached. Each metal end makes circular sliding electrical contact with a metal slip ring mounted on a side housing member. The assembly is drawn together and winding torque is supplied by an elastic member with parallel separated filaments that is fastened between the side housing members and pass through separate diametrical positions on the inside of the spool core to provide the rotation to the spool core.

DESCRIPTION OF INVENTION

Figure 1:
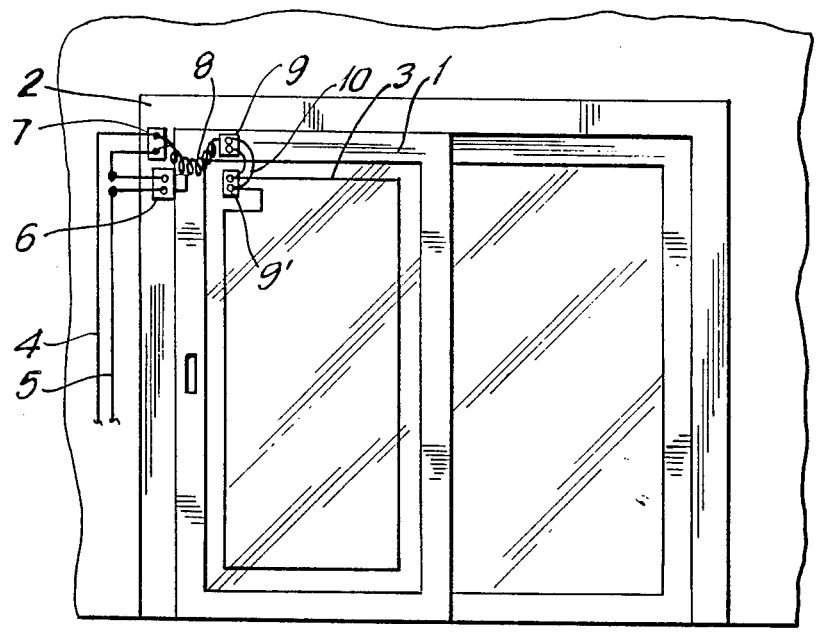
FIG. 1 is an illustration of a prior art type of retracting electrical door cord for a sliding door.

In the prior art installation as shown in FIG. 1, there is a continuity security circuit in which there are conductors 4 and 5. A switch 6 such as a magnetic Reed switch that can sense the presence of a magnet on the door 1 and thereby to detect opening thereof is in series in conductor 5. The conductors 4 and 5 are mounted to a terminal 7 to which is connected an extendible coil wire 8 extending to a door mounted terminal 9 mounted onto the frame of sliding door 1. The electrical conductors 10 are connected to a foil block connector 9' to which are connected the relatively fragile foil glass breakage continuity tape 3.

One disadvantage of this type of prior art arrangement, lies in the coil wire s and the fact that when the door or window is open, the coil wire s is somewhat of an obstruction in the opening. Furthermore, in the closed condition the coil wire tends to sag which both looks bad from an aesthetic viewpoint and also may cause accidents.

Figure 2:
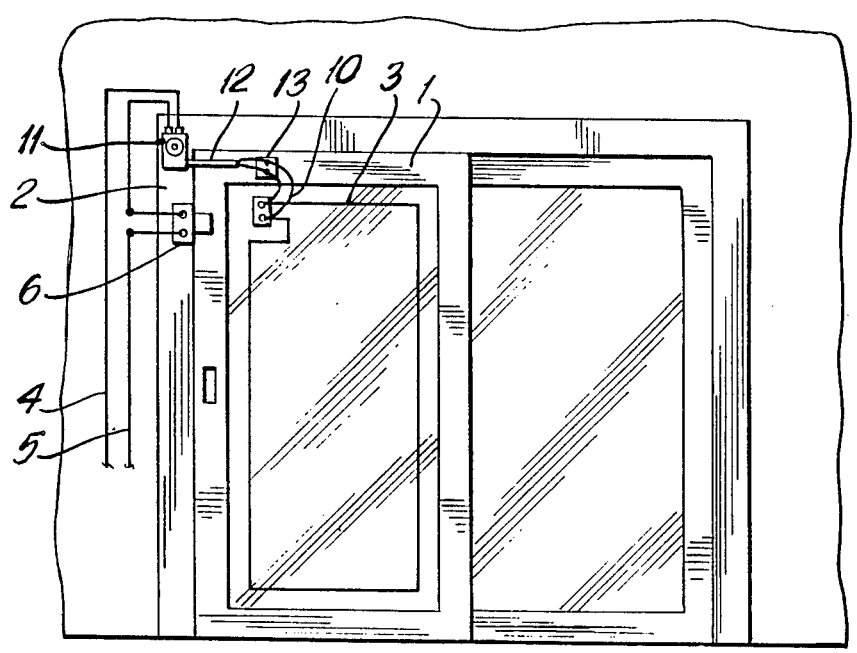
FIG. 2 is a schematic diagram of an installation of a retracting electrical door cord on a sliding door in accordance with an embodiment of this invention.

Referring next to FIG. 2, a retracting electrical door cord apparatus 11 is mounted on the support 2 and permits an electrical cord 12 to unwind as the door slides open, yet sufficient tension is provided so that the cord 12 will stay straight between the apparatus 11 and a wire retainer 13 on the door frame 1. Furthermore, as the door slides closed, the retracting apparatus pulls the wire back so that there is no wire sagging or hanging down.

Figure 3:
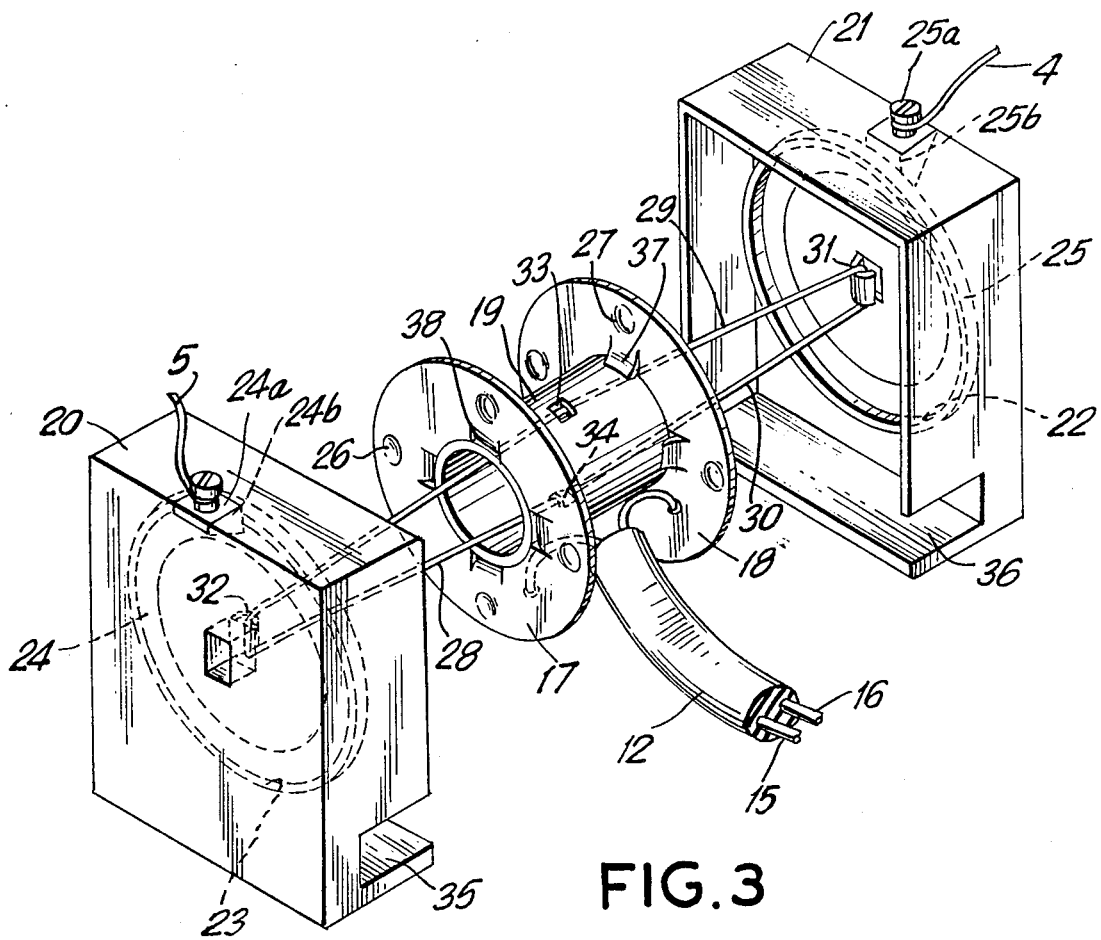
FIG. 3 is an exploded view of the retracting electrical door cord of the present invention.

In FIG. 3, an exploded sketch of the retracting apparatus 11 is provided. The cord 12 has two wire conductors 15 and 16, each one of which is respectively electrically attached as for example, by soldering, to one of the two conductor or metal ends 17 and 18, having a center or core section 19. The spool core 19 is of insulating material. The retracting apparatus has housing side elements 20 and 21 which join together to provide a housing for the retracting apparatus. In the sides 20 and 21 there are positioned electrical tracks 24 and 25, which provide external electrical connection through screws 24a and 25a and the terminals 24b and 25b connected to the tracks 24 and 25. The external wires 4 and 5 connect to the screws. A guide for the metal ends 17 and 18 of the spool is made in the form of a supporting lip 22 and 23.

The metal ends 17 and 18 have protrusions projecting from the surface and form sliding contacts 26 and 27 which ride around the tracks 24 and 25. A continuous band such as rubber band, forms opposed elastic filaments 29 and 30 which are kept separate by the width of retaining hooks 31 and 32 on inside of the housing side members 20, 21. These filaments pass through the center of the spool core and are held by opposite positioning hooks 33 and 34. A front mouth formed by the two slots 35 and 36 are provided in each of housing side members 20 and 21 to accommodate passage for cord 12 as it winds and unwinds. The core of the spool 19 is retained by the end members 17 and 18 through retaining fingers 37 and 38 with are inwardly struck from the end members about the periphery of the openings accommodating the core. Other types of attachments could be used. By way of example, the end members 17 and 18 could have cuffs which fit into the interior of the core of the spool 19 and held by a friction fit.

In operation, the elastic filaments 29 and 30 are untwisted and the wire is wound around the core of the spool. As the wire is pulled out through the mouth 35, 36, the spool rotates causing the filaments to become twisted together as shown in dotted lines in FIG. 4. The twisted filaments provide the necessary torque for rewinding the wire to retract it back into the apparatus and cause the filaments to return to their normal relaxed condition.

Figure 4:
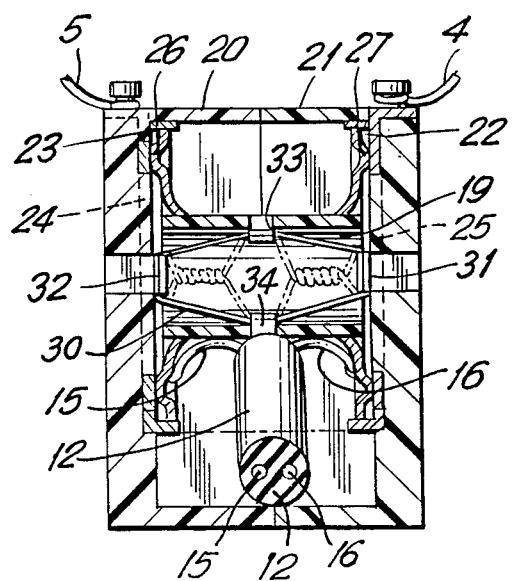
FIG. 4 is a cross-sectional schematic view through an assembled apparatus and showing the winding details.

The structure and operation of the apparatus can be seen more clearly in connection with FIG. 4 showing structural features and the details of the elastic filaments when wound and unwound. FIG. 4 shows a cross-sectional schematic view of the assembled expanded view of FIG. 3. In FIG. 4, conductors 15 and 16 of the cord 12 are shown soldered or electrically attached to the end members 17 and 18 and the protrusions 26 and 27 are in contact with the ring members 24 and 25. The end members 17 and 18 of the spool are supported by the lip members 22 and 23. Contact is, therefore, maintained from the incoming wires 4 and 5, through the screws and the contact terminals to the tracks. The protrusions riding in the tracks make contact to the end members and the wires are soldered to the end members.

In the retracted position, the cable 12 would be wound around the spool. The elastic filaments 29 and 30 go over the retainer hooks 31 and 32 and the fingers 33 and 34 diametrically positioned on the inside of the spool core 19. With the wire wound up, the filaments are relaxed.

As the door or window is moved away from the support 2 in FIGS. 1 or 2, the wire is pulled out of the mouth and the spool rotates. The rotation of the fingers 33 and 34 begin to wind the elastic filaments 28 and 29. Under the conditions where the cord 12 is in the extended position and the elastic filaments are twisted, the filaments are prepared to provide substantial torque in retracting the cable 12.

The retracting strain on the cable 12 will be greatest at the most extended position since in that position the elastic filaments 29 and 30 is tightly wound, therefore, the cable 12 in FIG. 2 will not sag or get in the way of the opening of the door. However, even in a partially open position there is enough torque to prevent sagging of the cable 12. Of course, when the door is slid closed, the cable 12 is wound on the core and is both safe and is aesthetically acceptable.

Figure 5:
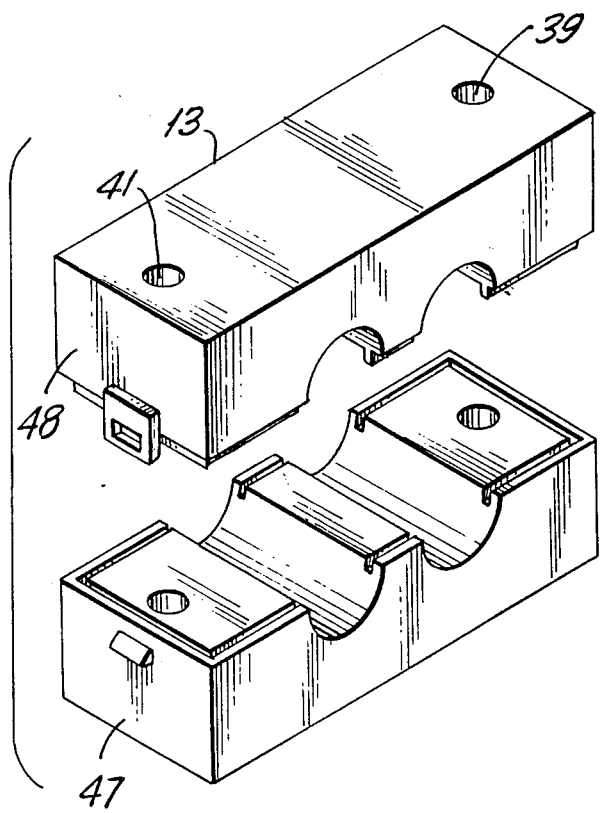
FIG. 5 is an exploded view of a wire retainer.

Referring next to FIG. 5, a cable retainer or stockade is provided in which two pieces, elements 47 and 48 are constructed with grooves smaller than the insulation of the cable 12 of FIGS. 2, 3, and 4, so that the cable will be clamped to restrain the wire rewinding force of the retractor 11 thereby keeping the rewinding strain off the cable 12 itself.

The embodiment of FIG. 5 provides for screw openings 39 and 40 which are available for insertion of screws to fasten the stockade to a frame. Other securing means can be used such as double sided tape. The two parts of the housing can be held together by a hinge or a snap fit arrangement.

Although a single cable having two wires with each wire separately insulated has been shown, it should be appreciated that a parallel cable could also be used and wound around the spool. Such parallel cable could then use both sides of the stockade.

What has been described is a core retracting apparatus for a door or window that extends and rewinds an electrical cord so as to keep it tight throughout the motion travel.

What is claimed is:

1. In an electrical continuity circuit apparatus, wherein an electrical cord is employed to provide a two wire electrical connection between a first point on a supply member and a second point on a movable member, the improvement comprising:
   two opposing housing side members;
   an electrical continuity maintaining hollow reel structure positioned at said first point, cord retention means positioned at said second point, said cord being wound on said reel structure in an operative position; and
   two elastic filaments extending between said housing side members and passing through said reel structure, said reel structure being provided on an interior thereof with two diametrically transversely opposing fastener means for guiding said filaments therethrough, whereby, upon pulling of said cord from the apparatus, said reel structure is rotated and said filaments are twisted in a direction of elongation thereof at two sides of said fastener means to provide a torque required for rewinding said cord to retract it back into the apparatus.

2. In an electrical continuity circuit apparatus, wherein an electrical cord is employed to provide a two wire electrical connection between a first point on a supply member and a second point on a movable member, the improvement comprising:
   two opposing housing side members;
   an electrical continuity maintaining hollow reel structure positioned at said first point, cord retention means positioned at said second point, said cord being would on said reel structure in an operative position; and
   two elastic filaments extending between said housing side members and passing through said reel structure, said reel structure being provided on an interior thereof with two diametrically opposing fastener means for guiding said filaments therethrough, whereby, upon pulling of said cord from the apparatus, said reel structure is rotated and said filaments are twisted in a direction of elongation thereof at two sides of said fastener means to provide a torque required for rewinding said cord to retract it back into the apparatus 4, wherein said reel structure comprises a spool core of tubular insulation material, first and second conductive end members positioned respectively at each end of said spool core, each of said opposing housing side members having a circular conductive track on an inner side thereof, terminal means extending through said housing side members for external connection thereto of feed wires, said terminal means being electrically connected to said tracks, contact means on said end members for riding along said tracks to maintain electrical contact between said end members and said tracks as said spool core rotates, and conductive means between said cord and said end members.

3. The circuit apparatus of claim 2, and further comprising a retainer means on each housing side member, said elastic filaments extending between said retainer means and passing through said spool core and said diametrically opposing fastener means which are provided on the interior of said spool core.

* * * * *